United States Patent
Elias et al.

(10) Patent No.: US 10,437,820 B2
(45) Date of Patent: Oct. 8, 2019

(54) ASYMMETRIC DISTRIBUTED CACHE WITH DATA CHAINS

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 713 days.

(21) Appl. No.: 14/820,272

(22) Filed: Aug. 6, 2015

(65) Prior Publication Data

US 2017/0039238 A1     Feb. 9, 2017

(51) Int. Cl.
| | |
|---|---|
| G06F 16/00 | (2019.01) |
| G06F 16/2453 | (2019.01) |
| G06F 16/951 | (2019.01) |
| G06F 16/957 | (2019.01) |
| G06F 16/2455 | (2019.01) |

(52) U.S. Cl.
CPC .. *G06F 16/24539* (2019.01); *G06F 16/24552* (2019.01); *G06F 16/951* (2019.01); *G06F 16/9574* (2019.01)

(58) Field of Classification Search
CPC ......... G06F 17/30457; G06F 17/30864; G06F 17/30902; G06F 16/24539; G06F 16/9574; G06F 16/24552; G06F 16/951
USPC ........................................................ 707/717
See application file for complete search history.

(56) References Cited

U.S. PATENT DOCUMENTS

| | | | |
|---|---|---|---|
| 5,878,223 A | 3/1999 | Becker et al. | |
| 6,055,569 A | 4/2000 | O'Brien et al. | |
| 7,716,332 B1 | 5/2010 | Topfl et al. | |
| 8,356,026 B2 | 1/2013 | Heimendinger | |
| 2010/0318538 A1* | 12/2010 | Wyman | G06F 17/30011 707/759 |
| 2011/0184936 A1* | 7/2011 | Lymberopoulos | G06F 17/30902 707/721 |

FOREIGN PATENT DOCUMENTS

| | | |
|---|---|---|
| CN | 10266578 | 9/2008 |
| WO | WO2014118590 | 8/2014 |

OTHER PUBLICATIONS

Youngmoon Eom, Jinwoong Kim, Deukyeon Hwang, Jaewon Kwak, Minho Shin, Beomseok Nam "Improving Multi-Dimensional Query Processing with Data Migration in Distributed Cache Infrastructure," 10 pages, Department of Computer Science Engineering Ulsan National Institute of Science and Technology (UNIST) Republic of Korea; Department of Computer Engineering Myongi University Republic of Korea, retrieved from http://dicl.unist.ac.kr/publications/hipc14.pdf on Aug. 7, 2015.

(Continued)

*Primary Examiner* — Monica M Pyo
(74) *Attorney, Agent, or Firm* — Haynes and Boone, LLP

(57) ABSTRACT

An example method of loading data from a database includes receiving, at a cache node, a current query and a data chain that includes a sequence of ordered queries. The method also includes determining whether a hash of the current query matches a hash of an expected query in the data chain. The method further includes retrieving a result set of the current query from a local cache in response to determining that the hash of the current query matches the hash of the expected query. The method also includes sending the result set of the current query to a client.

20 Claims, 13 Drawing Sheets

(56) References Cited

OTHER PUBLICATIONS

Ronny Lempel, Shlomo Moran Predictive Caching and Prefetching of Query Results in Search Engines, May 20-24, 2003; 10 pages, Department of Computer Science The Technion, Haifa 32000, Israel; Department of Computer Science The Technion, Haifa 32000; retrieved from http://www.cs.technion.ac.il/~moran/r/PS/www12.pdf on Aug. 7, 2015.

Marie-Aude Aufaure, Nicolas Kuchmann-Beauger, Patrick Marcel, Stefano Rizzi, Yves Vanrompay; "Predicting Your Next OLAP Query Based on Recent Analytical Sessions," 2013; 1 page, MAS Laboratory, École Centrale Paris, France; Université Francois Rabelais de Tours, France; DISI, University of Bologna, Italy; retrieved from http://link.springer.com/chapter/10.1007/978-3-642-40131-2_12#page-1 on Aug. 7, 2015.

Mert Akdere, Ugur C, Etintemel, Matted Riondato, Eli Upfal, Stanley B. Zdonik, "Learning-Based Query Performance Modeling and Prediction," 12 pages; Brown University, Providence, RI, USA retrieved from http://cs.brown.edu/~matteo/papers/AkdereEtAl-LearninQueryPerfModel-ICDE12.pdf on Aug. 7, 2015.

\* cited by examiner ize # US 10,437,820 B2

ASYMMETRIC DISTRIBUTED CACHE WITH DATA CHAINS

FIELD OF DISCLOSURE

The present disclosure generally relates to databases, and more specifically to retrieving result sets of queries from databases.

BACKGROUND

A client may send requests for data stored in a database. Databases may serve as persistent storage for clients. For example, a client may send a query to the database, and the database may execute the query and send a result set back to the client. The time it takes a database to process a query and send the result set of the query back to the client may be significant. Accordingly, it may be desirable to reduce an overall time necessary to load data from the database.

BRIEF SUMMARY

Methods, systems, and techniques for loading data from a database are provided.

According to some embodiments, a method of loading data from a database includes receiving, at a cache node, a current query and a data chain that includes a sequence of ordered queries. The method also includes determining whether a hash of the current query matches a hash of an expected query in the data chain. The method further includes retrieving a result set of the current query from a local cache in response to determining that the hash of the current query matches the hash of the expected query. The method also includes sending the result set of the current query to a client.

According to some embodiments, a system for loading data from a database includes a cache node that receives a current query and a data chain, stores the data chain in a local cache, and hashes the current query. The data chain includes a sequence of ordered queries. The system also includes a gateway that receives a plurality of queries in succession, generates one or more data chains in accordance with the plurality of queries received in succession, and sends one or more data chains to the cache node. The cache node determines whether a hash of the current query matches a hash of an expected query in the data chain, retrieves a result set of the current query from the local cache in response to determining that the hash of the current query matches the hash of the expected query, and sends the result set of the current query to a client.

According to another embodiment, a machine-readable medium includes a plurality of machine-readable instructions that when executed by one or more processors is adapted to cause the one or more processors to perform a method including: receiving, at a cache node, a current query and a data chain that includes a sequence of ordered queries; determining whether a hash of the current query matches a hash of an expected query in the data chain; retrieving a result set of the current query from a local cache in response to determining that the hash of the current query matches the hash of the expected query; and sending the result set of the current query to a client.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
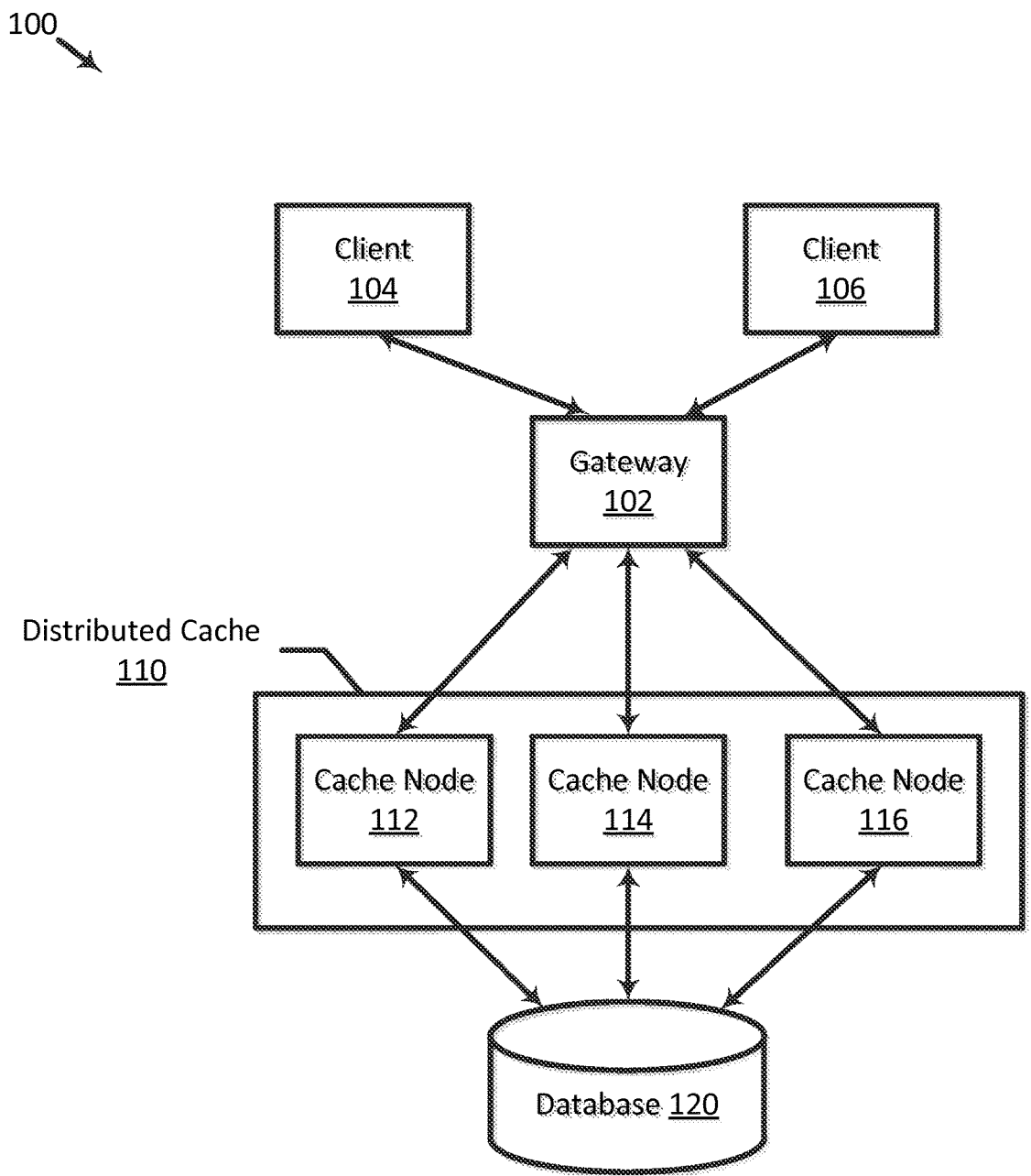
FIG. 1 is a block diagram illustrating a system for loading data from a database in accordance with some embodiments.

I. Overview
II. Example System Architecture
III. Generate Data Chains
   A. Collect Queries and Store in an Order in Which They are Received
   B. Search for Popular Sequences of Queries
      1. A Popular Sequence of Queries is Found in Ordered Sets of Queries
      2. Subsequent Iterations
      3. No Popular Sequences of Queries Are Found in Ordered Sets of Queries
IV. Exploit the Data Chains to Improve Query Processing
   A. Gateway Determines Whether Hashes of Current and Expected Queries Match
   B. Cache Node Receives and Stores the Data Chain
      1. Cache Node Processes Current Query
      2. Cache Node Preloads a Result Set of Expected Query
   C. Gateway Receives a Query From a Client
V. Example Methods
VI. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An application may send a similar succession of queries to a database. The present disclosure provides techniques to reduce an overall time necessary to load data from the database. In an example, a client may communicate with a database to process queries based on client requests. The client may submit multiples queries to the database, and some of these queries may be the same. For example, a company may provide an attendance information system for employees. Employees may log their attendance into the system and also check their current amount of paid time off (PTO) days. A user may log into the system, check her amount of PTO days, and then check her attendance. Based on the observation of requests that are sent to the database, a data chain may be created to predict which request(s) will be sent to the database. A data chain includes a sequence of ordered queries that are submitted to the database from one or more clients. Each data chain is associated with a next query pointer that references an expected query in the data chain.

According to some embodiments, a system for loading data from a database includes a cache node that receives a current query and a data chain, stores the data chain in a local cache, and hashes the current query. The data chain includes a sequence of ordered queries. The system also includes a gateway that receives a plurality of queries in succession, generates one or more data chains in accordance with the plurality of queries received in succession, and sends one or more data chains to the cache node. The cache node determines whether a hash of the current query matches a hash of an expected query in the data chain, retrieves a result set of the current query from the local cache in response to determining that the hash of the current query matches the hash of the expected query, and sends the result set of the current query to a client.

The present disclosure provides techniques to load data from a database. Unless specifically stated otherwise, as apparent from the following discussion, it is appreciated that throughout the description, discussions utilizing terms such as "determining," "generating," "sending," "receiving," "executing," "obtaining," "storing," "updating," "removing," "identifying," "hashing," "removing," "searching," "deleting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram illustrating a system 100 for loading data from a database in accordance with some embodiments. System 100 includes a gateway 102 that is coupled to clients 104 and 106 that may send queries to a database 120 for execution via gateway 102. Database 120 may be a persistent storage that is used by clients. A client may be, for example, a web service, web application, information system, or an administrator who/that accesses data stored in database 120. In an example, a client sends a query to database 120, and gateway 102 intercepts the query. In another example, a client sends a query to gateway 102, which takes care of processing the query and returning the result set back to the client.

Gateway 102 may collect information about the queries and observe an order in which the queries are submitted by the clients. In some examples, gateway 102 detects that certain queries are being submitted in certain succession (in a "data chain"), and predicts which queries will be submitted next from clients based on gateway 102's observations. A particular sequence of ordered queries may be sent multiple times by one or more clients, and gateway 102 may detect that the sequence has been sent above a threshold number of times within a time period. If gateway 102 detects this sequence of ordered queries has been sent above the threshold number of times, gateway 102 may identify the sequence of ordered queries as a popular sequence of ordered queries and generate a data chain that includes the popular sequence of ordered queries. Gateway 102 stores the data chain in a storage device for later retrieval. The data chain may be exploited to improve the performance of loading data from the database by proactively "preloading" data from the database, as will be further discussed below.

Gateway 102 is also coupled to a distributed cache 110 that includes cache nodes 112, 114, and 116. Each of cache nodes 112, 114, and 116 is coupled to database 120 and may cache data stored in database 120. A cache node may preload data from the database by submitting a query to the database before the cache node actually receives the query from a client for processing. A cache node may retrieve data from its own local cache or an external source (e.g., database 120 or another cache node).

Although two clients, one gateway, one distributed cache, and one database are illustrated, this is not intended to be limiting, and system 100 may include more than or fewer than two clients, more than one gateway, more than one distributed cache, and/or more than one database. Additionally, distributed cache 110 may include one or more cache nodes.

Each of clients 104 and 106, gateway 102, distributed cache 110, and database 120 may be coupled to a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

III. Generate the Data Chains

Figure 2A:
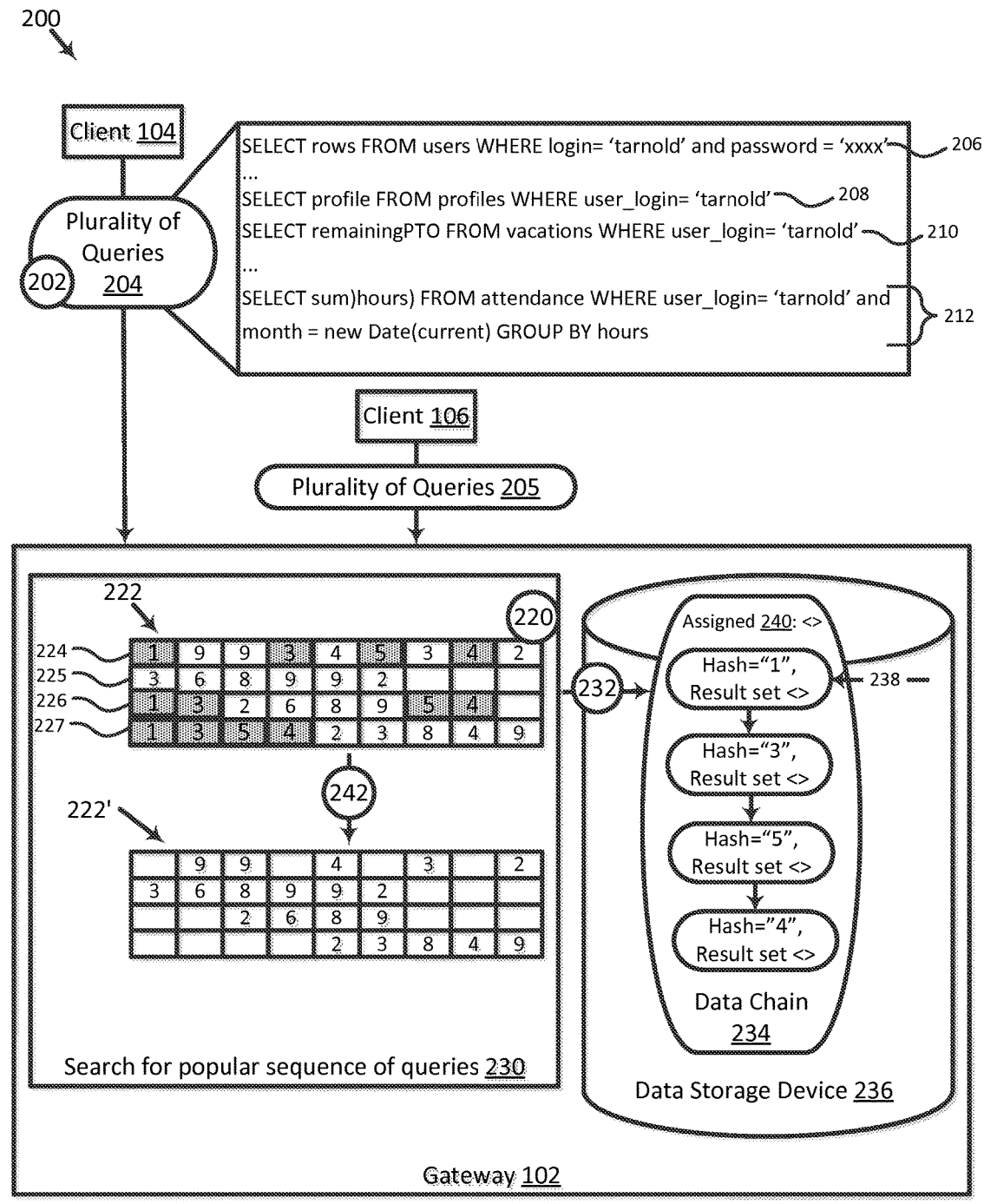
FIGS. 2A and 2B illustrate a process flow of the generation of one or more data chains in accordance with some embodiments.
Figure 2B:
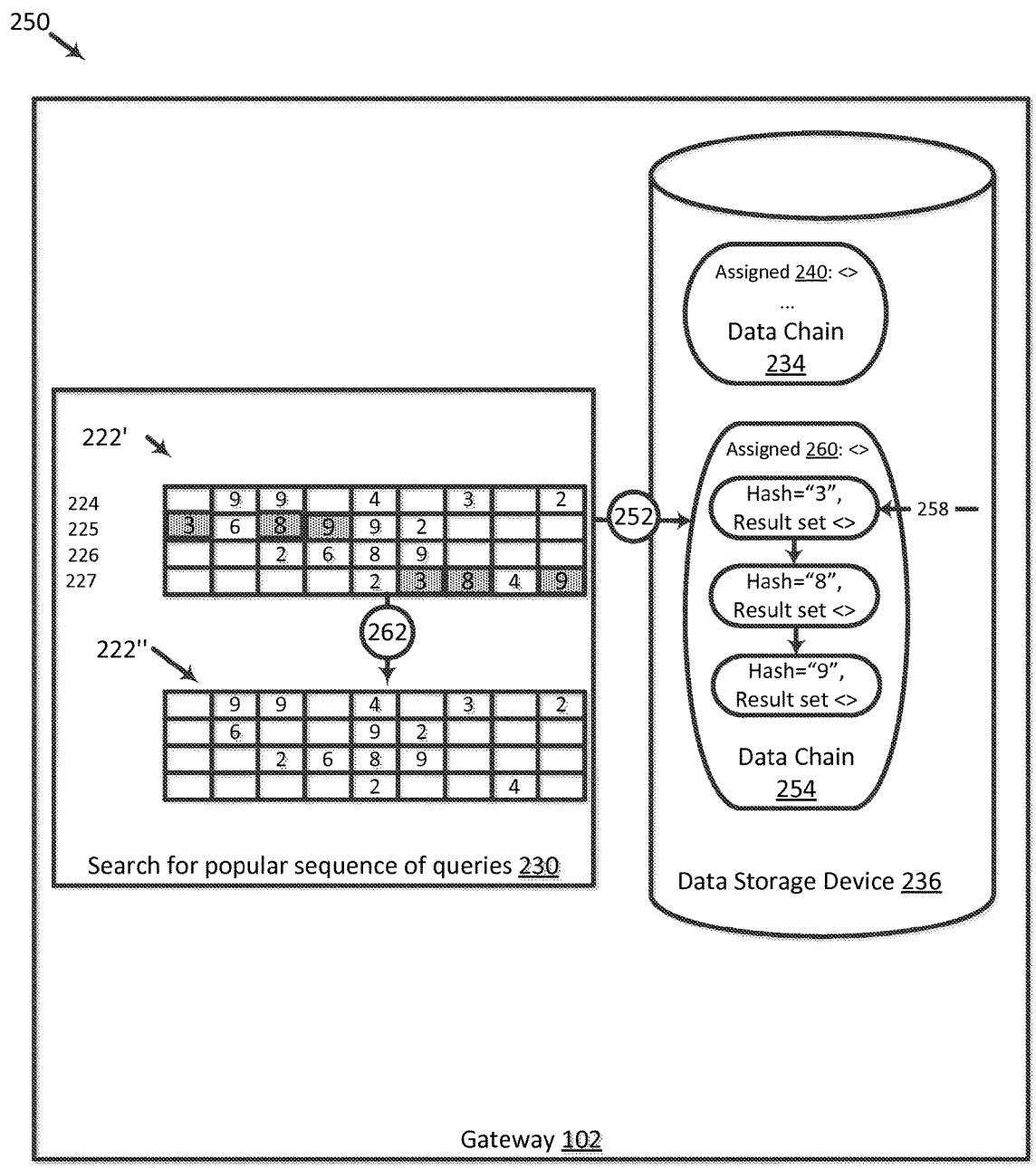

The present disclosure provides techniques that use data chains to reduce the overall time necessary to load data from database(s) 120. FIGS. 2A and 2B illustrate a process flow 200, 250 of the generation of one or more data chains in accordance with some embodiments.

A. Collect Queries and Store in an Order in Which They Are Received

In FIG. 2A, at an action 202, client 104 submits a plurality of queries 204 for execution to gateway 102 and/or database 120. It should be understood that one or more clients may send a plurality of queries to gateway 102 and/or database 120. For example, client 106 may also submit a plurality of queries 205 for execution to gateway 102 and/or database 120. In an example, a client sends a query to database 120, and gateway 102 intercepts the query. In another example, the client sends a query to gateway 102 for processing, and gateway 102 submits the query to a cache node to obtain the result set of the query.

A query may include an expressions clause (e.g., table columns from which or calculations that a client desires to retrieve), one or more database tables from which to retrieve the data requested by the client, and zero or more conditions clauses (e.g., condition(s) that must be met for a database record to be selected). In an example, a query may be a Structured Query Language (SQL) query of the form "SELECT Column1, Column2, . . . , ColumnX FROM Table1, Table2, . . . , TableY WHERE Condition1, Condition2, . . . , ConditionZ."

Plurality of queries 204 includes queries 206, 208, 210, and 212, which are an example of a succession of requests that may be sent by client 104 for processing. Query 206 is "SELECT rows FROM users WHERE login='tarnold' and password='xxxx'", query 208 is "SELECT profile FROM profiles WHERE user_login='tarnold'", query 210 is SELECT remainingPTO FROM vacations WHERE user_login='tarnold'", and query 212 is SELECT sum (hours) FROM attendance WHERE user_login='tarnold' and month=new Date(current) GROUP BY hours". In an example, client 104 may send query 206, then query 208, then query 210, and then query 212 for execution at database 120, and gateway 102 may receive these queries in this order. Client 104 may submit queries 206, 208, 210, 212 consecutively in this listed order, or may submit one or more queries between client 104's submission of query 206, query 208, query 210, and/or query 212.

At an action 220, gateway 102 creates a table 222 having a plurality of rows. In the example illustrated in FIG. 2A, table 222 includes rows 224-227, and each row includes an ordered set of queries (based on their hashes). In an example, gateway 102 hashes queries of plurality of queries 204 and generates an ordered set of queries for each data chain interval. A hash of a query identifies that query, and the values in table 222 are hashes of queries. Each query in a data chain may be identified by the hash of the query. The queries (or their hashes as illustrated in FIG. 2A) are placed in the cells of a row in accordance with the order in which the clients submit the queries or the order in which gateway 102 receives the queries.

A data chain interval is the maximal time interval for the longest sequence of queries in a data chain. Gateway 102 may store data in one row of table 222 during the data chain interval. After the data chain interval elapses, gateway 102 may collect data for the next row of table 222. The data chain interval may be, for example, 15 minutes, an hour, etc. The data chain interval may vary depending on various factors such as the number of queries expected from clients per time unit, etc. In this example, the more queries that are expected from clients per unit time, the shorter the data chain interval may be.

In an example, during a first data chain interval, gateway 102 receives and hashes query 206 to produce the hash "1" and stores it in the first cell of row 224 in table 222, receives and hashes another query to produce the hash "9" and stores it in the second cell of row 224 in table 222, and so on. During a second data chain interval, gateway 102 receives and hashes a query to produce the hash "3" and stores it in the first cell of row 225 in table 222, hashes another query to produce the hash "6" and stores it in the second cell of row 225 in table 222, and so on. The hashes in table 222 may identify queries that are sent from both clients 104 and 106.

B. Search for Popular Sequences of Queries

Gateway 102 identifies one or more popular sequences of queries in the received queries sent in succession. Queries listed in a popular sequence of queries may be listed in an order in which they were sent from a client or received at gateway 102. It should be understood that it is unnecessary for the queries to be sent consecutively one after the other. Rather, zero or more queries may have been received by gateway 102 between receiving two adjacent queries listed in a popular sequence of queries.

Gateway 102 may determine whether particular conditions are satisfied before searching for popular sequences of queries in table 222. For example, gateway 102 may determine whether a number of rows in table 222 is greater than a count threshold. A count threshold indicates how many data chain intervals (or rows in table 222) are needed to generate a data chain. In this example, gateway 102 may wait until it has generated N ordered sets of queries before detecting data chains, where N is the count threshold and greater than 1.

Additionally, gateway 102 may use various criteria to detect a popular sequence of queries. For example, gateway 102 may determine whether a frequency in which a particular sequence of queries appears in rows 224-227 is greater than a frequency threshold. The frequency threshold indicates an expected frequency of a particular sequence of queries before it can be identified as a popular sequence of queries. In another example, gateway 102 may determine whether a length of a particular sequence of queries in rows 224-227 is greater than a length threshold. A length threshold indicates the minimal length of a popular sequence of queries.

In an example, the data chain interval is 15 minutes, N is 30, the frequency threshold is 5%, and the length threshold is 20. In another example, the data chain interval is an hour, N is 4, the frequency threshold is 50%, and the length threshold is 3. In this example, gateway 102 generates a new row that includes an ordered set of queries every hour (e.g., generates row 224 after the first hour, generates row 225 after the second hour, and so on), and inserts this new row into table 222. In an example, if gateway 102 inserts a new row N+1 (e.g., row 5 in table 222) into table 222, gateway 102 discards the oldest row in table 222. In this example, table 222 may remain at a manageable size. In another example, if gateway 102 inserts a new row N+1 into table 222, gateway 102 replaces the oldest row in table 222 with the new row.

1. A Popular Sequence of Queries is Found in the Ordered Sets of Queries

At an action 230, gateway 102 starts searching for popular sequences of queries in table 222 after the 4 ordered sets of queries have been generated and stored in table 222. Gateway 102 may continually search the rows in table 222 for popular sequences of queries as new data is inserted into table 222. In a first iteration, gateway 102 searches the N (e.g., four rows 224-227) ordered sets of queries for one or more popular sequences of queries, where N is the count threshold. In an example, gateway 102 searches for a longest popular sequence of queries in table 222, where a frequency in which the popular sequence of queries appears in the 4 ordered sets of queries (rows 224-227) is greater than the frequency threshold (e.g., 50%). In another example, gateway 102 searches for a longest popular sequence of queries in table 222, where a length of the longest popular sequence of queries is greater than the length threshold (e.g., 3). In some examples, gateway 102 uses both the frequency threshold and the length threshold as criteria in detecting popular sequences of queries.

Gateway 102 may find a longest popular sequence of queries that abides by the criteria. In keeping with the above examples in which the frequency threshold is 50% and the length threshold is 3, sequence of queries "1354" appears in three of the four rows (75% of the rows), which is greater than the 50% frequency threshold, and has a chain length of 4, which is greater than the length threshold of 3. Accordingly, gateway 102 may detect the sequence of queries "1354," which is shown as a shaded area in table 222, as being a popular sequence of queries. A sequence of ordered queries may be in the form of the queries themselves or their hashes. In an example, the hash of query 206 is "1", the hash of query 208 is "3", the hash of query 210 is "5", and the hash of query 212 is "4". In this example, sequence of queries "1354" refers to queries 206, 208, 210, and 212, respectively.

Gateway 102 generates one or more data chains based on the one or more identified popular sequences of queries. Gateway 102 may generate data chains dynamically during runtime. At an action 232, gateway 102 generates a data chain 234 and saves the data chain in a data storage device 236. Data chain 234 includes the hashes "1", "3", "5", and "4" of the popular sequence of ordered queries "1354" and a blank result set. In some examples, gateway 102 creates a linked list of elements, where each element includes a hash of a query in the popular sequence of queries and a result set of the respective query. The elements included in data chain 234 may be ordered in accordance with the popular sequence of ordered queries.

A blank data chain is a data chain that has not been activated by a cache node yet. A cache node activates a data chain when it receives a query that is included in the data chain. Gateway 102 maintains a next query pointer that references the next expected query to be submitted by a client. Each query that precedes the expected query in the sequence has been processed by a cache node. A next query pointer may be initialized by referencing a value indicating that the data chain has not yet been activated yet. In an example, the value is the first element in data chain 234. In another example, the value is NULL.

Additionally, data chain 234 has an "Assigned" field 240 that indicates whether the data chain has been activated by a cache node yet and if so, which cache node. If the value of the "Assigned" field 240 in a data chain is NULL or empty, then the data chain has not been activated yet.

In the example illustrated in FIG. 2A, a data chain includes a plurality of elements, where each element includes a hash of a query and its result set. This is not intended be limiting, and data chain may include more or less information than that shown in data chain 234. In some examples, a data chain includes the query itself, a timestamp of when the query was sent by the client and/or received by gateway 102, and/or other information.

Additionally, a data chain may store data in its elements in a different manner. For example, a first element in a data chain may store the sequence of ordered queries, a second element in the data chain may store the hashes in an order in accordance with their corresponding queries listed in the first element, and a third element in the data chain may store the results sets of queries in an order in accordance with their corresponding queries listed in the first element. In another example, a data chain may be represented as an array that stores each hash of a query listed in the popular sequence of queries. In this example, gateway 102 may keep an index count that indicates the next expected query to be submitted. These are merely examples that are not intended to be limiting.

At an action 242, gateway 102 removes each occurrence of the popular sequence of ordered queries ("1354") from table 222 to produce table 222'.

2. Subsequent Iterations

In a second iteration, gateway 102 starts searching for one or more popular sequences of queries in table 222' using the techniques described in relation to table 222. In FIG. 2B, at an action 230, gateway 102 continues to search for popular sequences of queries in table 222'. Gateway 102 may detect the sequence of queries "389," which is shown as a shaded area in table 222', as being a popular sequence of queries in the table.

At an action 252, gateway 102 generates a data chain 254 and saves the data chain in data storage device 236. Data chain 254 includes the hashes "3", "8", and "9" of the popular sequence of queries "389" and a blank result set.

Gateway 102 maintains a next query pointer 258 that references the next expected query to be submitted by a client in data chain 2554. Next query pointer 258 may be initialized by referencing a value indicating that the data chain has not been activated yet. In an example, the value is the first element in data chain 236. In another example, the value is NULL. Additionally, data chain 236 has an "Assigned" field 260 that indicates whether the data chain has been activated by a cache node yet and if so, which cache node.

At an action 262, gateway 102 removes each occurrence of the popular sequence of queries ("289") from table 222' to produce table 222". In a third iteration, gateway 102 starts searching for one or more popular sequences of ordered queries in table 222" using the techniques described in relation to table 222.

2. No Popular Sequences of Queries are Found in Ordered Sets of Queries

Gateway 102 may be unable to find any more popular sequences of ordered queries that satisfy the criteria (e.g., frequency threshold=50% and length threshold=3). If gateway 102 does not find a popular sequence of queries that satisfies the criteria, then gateway 102 may temporarily cease to detect data chains until another row is added to the table. In some examples, gateway 102 inserts the new rows into table 222 and searches this table. In some examples, gateway 102 inserts the new row into table 222' (the resulting table after the popular sequence(s) of ordered queries is removed from table 222) and searches this table.

IV. Exploit the Data Chains to Improve Query Processing

After gateway 102 has generated one or more data chains, gateway 102 and distributed cache 110 may start to leverage this knowledge to improve query processing and response time. Gateway 102 and distributed cache 110 may maximize the cache hit ratio using prediction and the data chains. Using a data chain, a cache node may be able to reduce the response time of a query because the cache node is able to successfully predict queries and load result sets of queries from external sources before the cache node actually receives the queries for processing. A cache node loads data that it expects to be requested, in advance. Each of the cache nodes may be associated with its own cache, and a cache node may cache one or more data chains. Each cached data chain may include a hash of a query and either a blank result set or the result set of the query. Every cache associated with a cache node may contain unique data. An advantage of an embodiment may be ease of scalability. For example, a cache node may be easy to add to distributed cache 110.

Figure 3A:
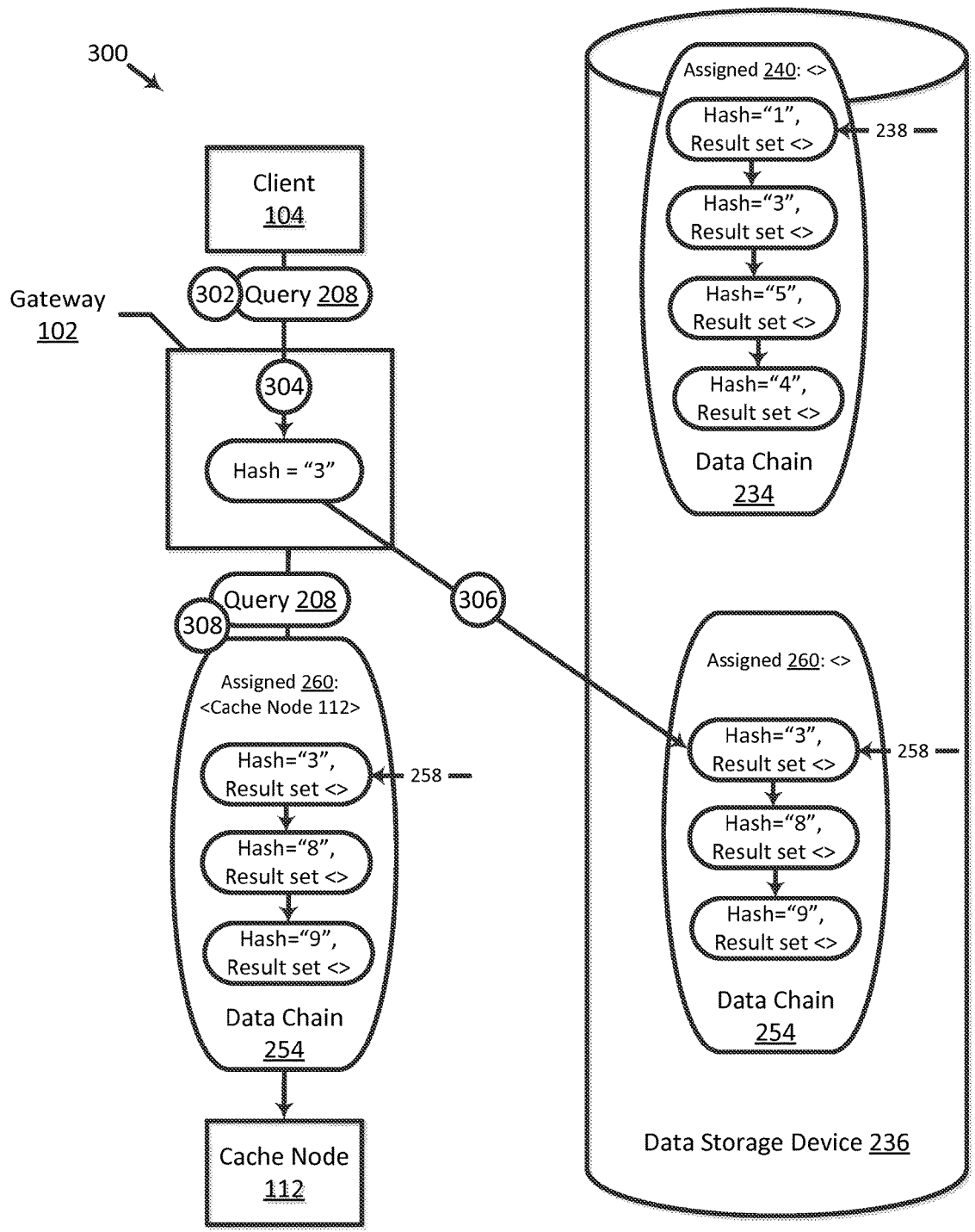
FIGS. 3A-3G are example process flows of loading data from a database in accordance with some embodiments.

FIGS. 3A-3G are example process flows 300, 320, 330, 340, 350, 360, and 370 of loading data from a database in accordance with some embodiments. In FIG. 3A, at an action 302, client 104 sends query 208 for execution at database 120, and gateway 102 receives query 208. At an action 304, gateway 102 hashes query 208. The hash of query 208 is "3." Query 208 may also be referred to as the "current query" because the query has been sent by a client but not yet processed.

A. Gateway Determines Whether Hashes of Current and Expected Queries Match

Gateway 102 determines whether the hash of query 208 matches any hash of an expected query in data storage device 236. Gateway 102 maintains data storage device 236. In FIG. 3A, data storage device 236 stores data chains 234 and 236, and each of these data chains has an expected query. Next query pointer 238 references the expected query (identified by hash "1") in data chain 234, and next query pointer 258 references the expected query (identified by hash "3") in data chain 236. In some examples, if the next query pointer associated with a data chain references NULL, the expected query of the data chain is the query in the first element listed in the data chain.

If gateway 102 determines that the hash of query 208 does not match a hash of any of the expected queries in data chain 234 or data chain 254, gateway 102 may select any of the cache nodes in distributed cache 110 to process query 208. In an example, a hash of query 208 does not match a hash of any of the expected queries in data chain 234 or 254 if the hash is not equal to "1" or "3." Alternatively, the hash of query 208 matches a hash of an expected query in data chain 234 or 254 if the hash is equal to "1" or "3."

When gateway 102 receives a current query from a client, gateway 102 tries to find a data chain in data storage device 236 that has a next query pointer that references an element that stores the hash of the current query. At an action 306, gateway 102 determines whether the hash of query 208 ("3") matches a hash of any of the expected queries in data chain 234 or data chain 254. The hash of query 208 matches the hash of the first query listed in data chain 254 and identified by the hash "3".

A data chain matches a hash of a current query if the hash of the expected query in the data chain matches the hash of the current query. Gateway 102 may determine whether the matching data chain 256 has been activated. If the matching data chain has not been assigned to a cache node yet, then the data chain has not been activated. At an action 308, if the data chain has not been assigned to a cache node in data chain yet, gateway 102 assigns the data chain to a cache node and sends the data chain along with query 208 to the assigned cache node. After gateway 102 has received an expected query in a data chain, gateway 102 updates the next query pointer to reference the next element in the data chain. Gateway 102 may evenly distribute unactivated data chains to cache nodes in distributed cache 110.

B. Cache Node Receives and Stores the Data Chain

1. Cache Node Processes Current Query

Figure 3B:
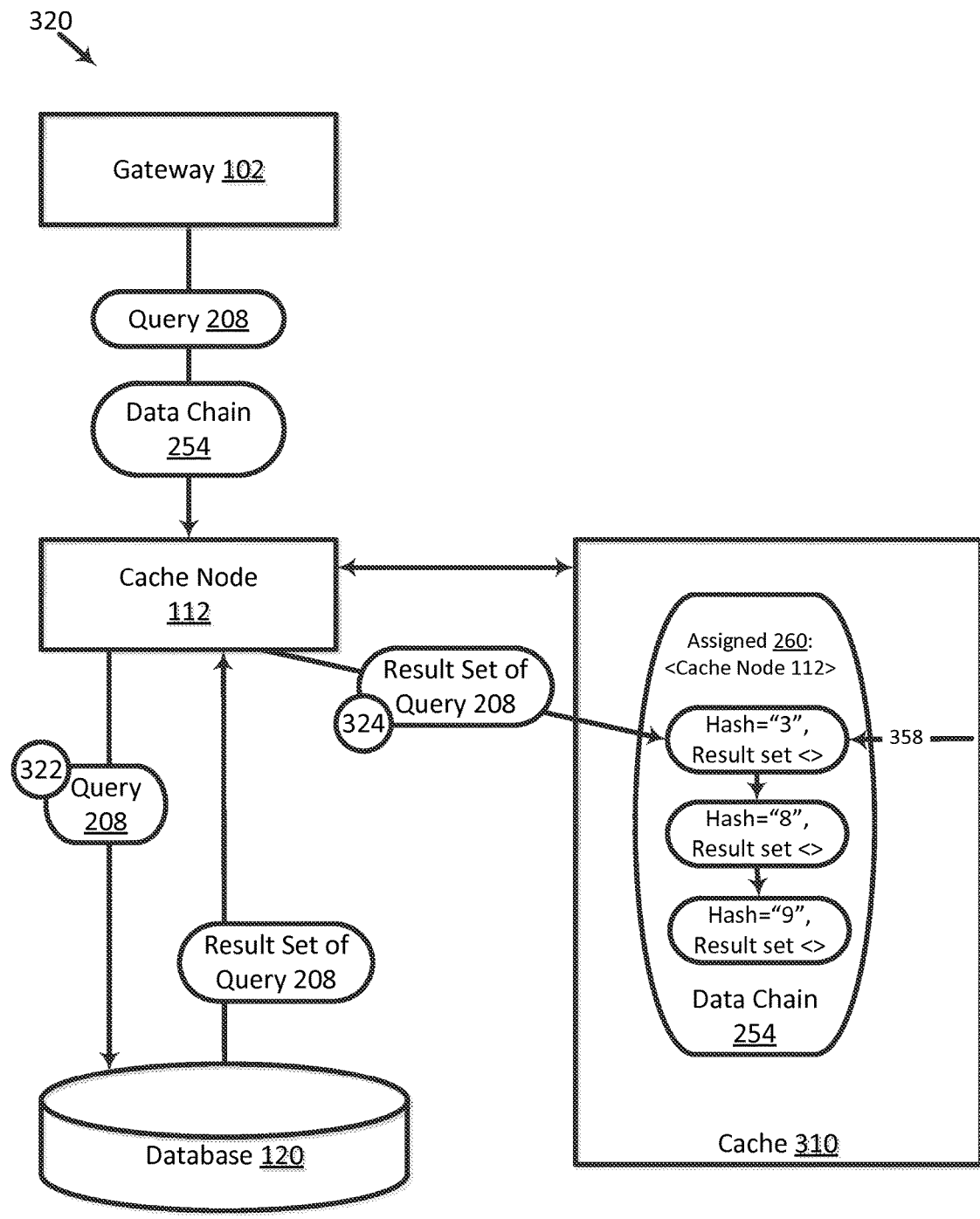

In FIG. 3B, cache node 112 may receive data chain 254 and query 208 from gateway 102, and store data chain 254 in its associated cache 310. The result sets of the queries identified by hashes "3", "8", and "9" are empty because the result sets of these queries have not yet been retrieved by cache node 112. Because a result set of query 208, which corresponds to hash "3" is not stored in cache 310, cache node 112 submits query 208 to an external source to obtain a result set of query 208. Cache node 112 retrieves the result set of query 208 from the external source. Although cache node 112 is described as processing and storing a data chain, it should be understood that any of the cache nodes may process and store a data chain.

At an action 322, cache node 112 submits query 208 to database 120 for execution. Database 120 may execute query 208 against its database tables, retrieve a result set of query 208, and send the result set of query 208 to cache node 112. Cache node 112 receives the result set of query 208. At an action 324, cache node 112 stores the result set of query 208 in the element to which next query pointer 358 references in data chain 254.

In some examples, cache node 112 retrieves the result set of query 120 from an external source that is not database 120. In an example, cache node 112 determines whether any of the other cache nodes in distributed cache 110 (e.g., cache node 114 or cache node 116) has a result set of query 208 cached. Cache node 112 may send a request to cache node 114 for this result set. If cache node 114 has the result set of query 208 cached, cache node 114 may send it to cache node 112, which then caches the result set of query 208 in cache 310 and returns the result set of query 208 to client 104. Alternatively, cache node 114 may send the result set of query 208 to client 104, and send a message to cache node 112 that cache node 114 has sent the result set of query 208 to the client. In this case, cache node 112 may store in the result set of the first element a reference to cache node 114 (or its associated cache) and update the applicable next query pointer if cache node 114 has a cached result set of this query. In some examples, if cache node 112 does not have a result set of a query in cache 310, cache node 112 always attempts to find the result set of the query in any other cache nodes before cache node 112 loads or preloads data directly from database 120.

Figure 3C:
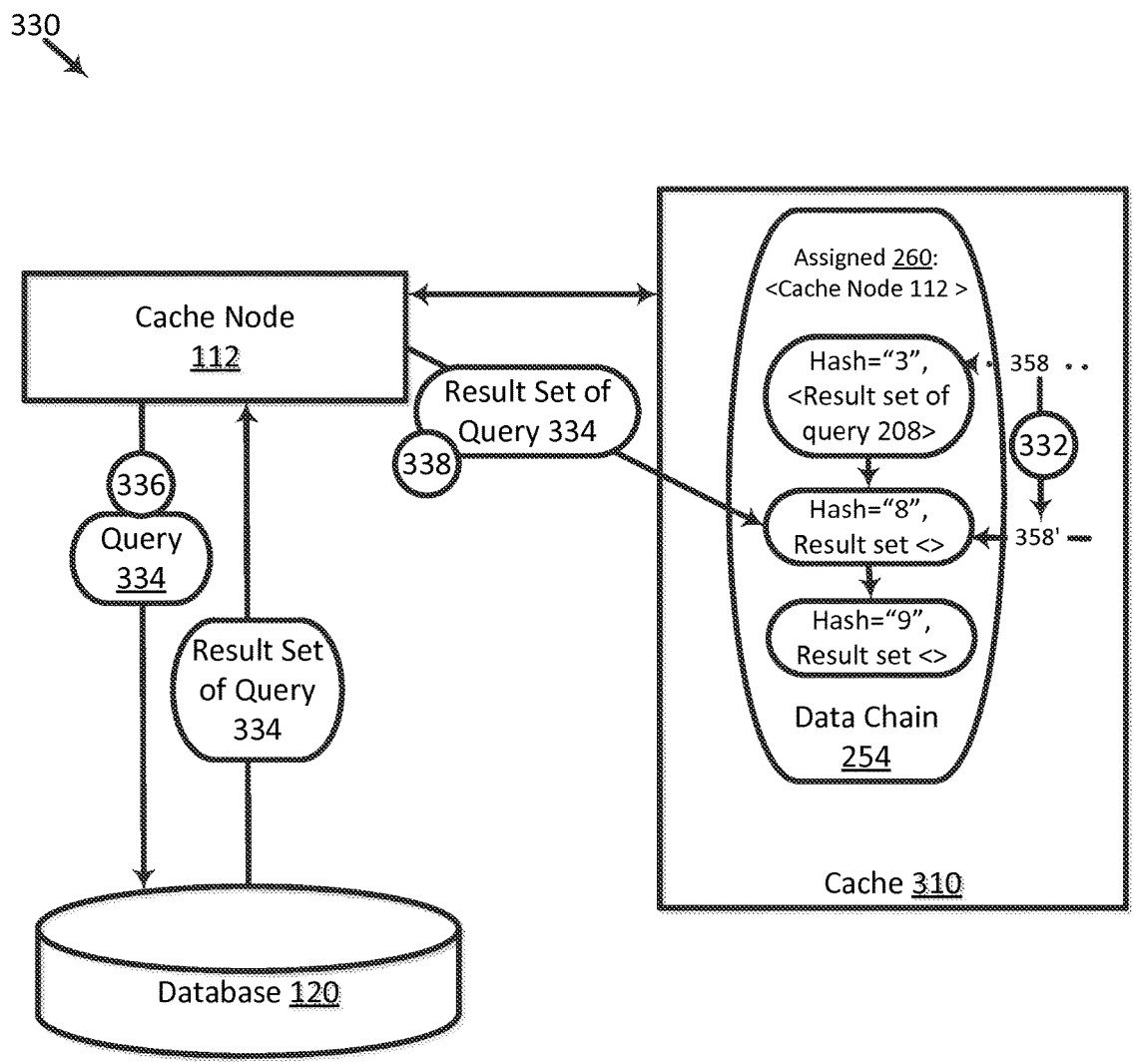

FIG. 3C illustrates an example of cache 310 after cache node 112 stores the result set of query 208 in the element to which next query pointer 358 references and updates next query pointer 358 in accordance with some embodiments. In FIG. 3C, the result set of query 208 is cached in data chain 254. After cache node 112 has finished processing a query referenced by the next query pointer, cache node 112 may update the next query pointer to reference the next element in the data chain. In an example, cache node 112 has finished processing a query if cache node 112 has retrieved a result set of the query or has sent the result set of the query to a client via gateway 102.

At an action 332, cache node 112 updates next query pointer 358 to reference the next consecutive element listed in data chain 254. Next query pointer 358', which references the second element listed in data chain 254, represents the updated next query pointer 358. Next query pointer 358' references a query in data chain 254 that cache node 112 expects to receive next; this query may be referred to as the expected query.

2. Cache Node Preloads a Result Set of Expected Query

The next query in data chain 254 is identified by the hash "8". Cache node 112 may leverage the knowledge it has in knowing that the query identified by hash "8" is predicted to be sent by a client. Additionally, the query identified by hash "9" is predicted to be sent by a client after the query identified by hash "8" is received. Cache node 112 may "preload" the result sets of one or more these queries by submitting them to database 120 before actually receiving these queries for processing. A cache node may preload M consecutive requests, where M is a number greater than 0. For example, if M is 1, then cache node 112 may preload a result set of the query identified by the hash "8". If M is 2, then cache node 112 may preload two result sets, a result set of the query identified by the hash "8" and a result set of the query identified by the hash "9". When a cache node preloads a result set of a query, the cache node may send a message to gateway 102 that the cache node is preloading the result set of the query.

In FIG. 3C, query 334 may be the query identified by hash "8". In an example, cache node 112 determines this query by sending a request to gateway 102 for the actual query itself. In another example, this query is included in a data chain that is sent by gateway 102 and is associated with the hash "8". At an action 336, cache node 112 submits query 334 to an external source in order to retrieve a result set of query 334. In the example illustrated in FIG. 3C, cache node 112 submits query 334 to database 120 for execution. Database 120 may execute query 334 against its database tables, retrieve a result set of query 334, and send the result set of query 334 to cache node 112. Cache node 112 receives the result set of query 334. At an action 338, cache node 112 stores the result set of query 334 in the element to which next query pointer 358' references in data chain 254. Cache node 112 may preload the following (M−1) result sets of queries sequentially.

Figure 3D:
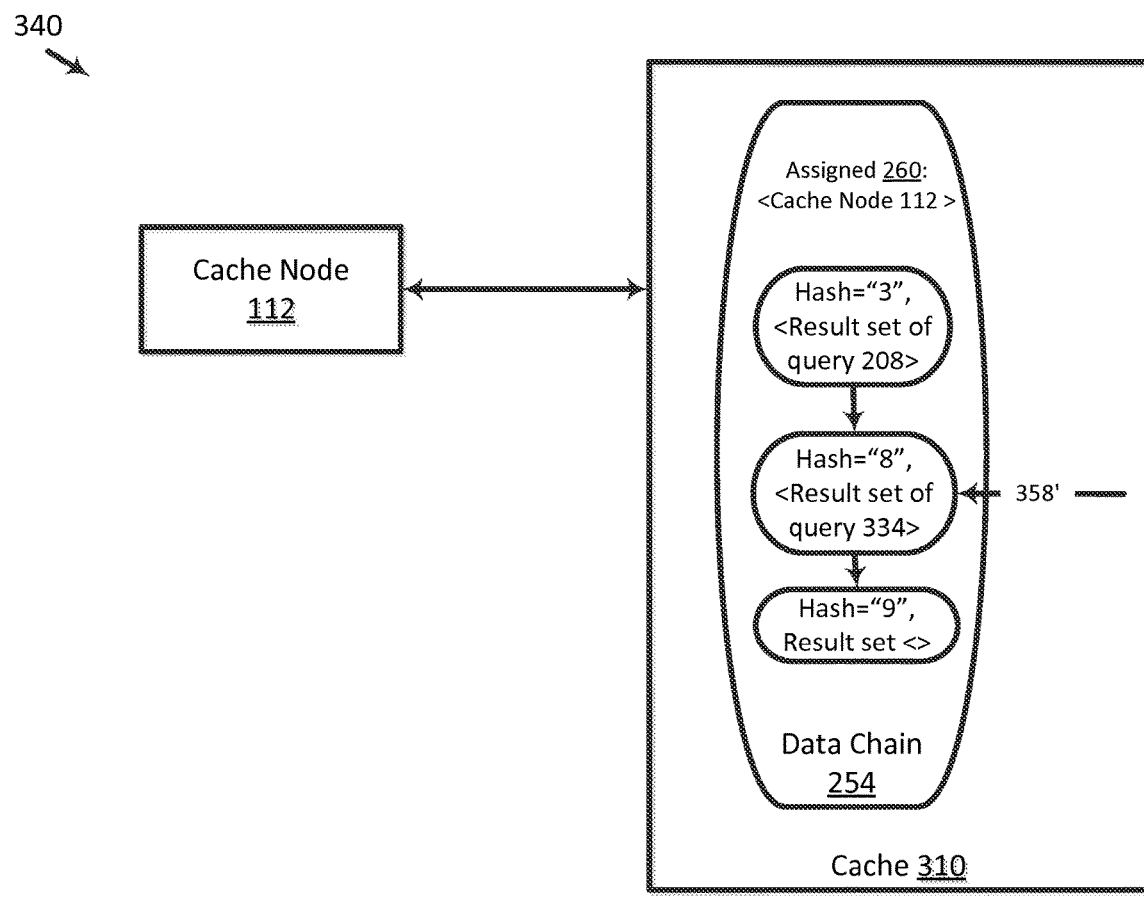

FIG. 3D illustrates an example of cache 310 after cache node 112 stores the result set of query 334 in the cache in accordance with some embodiments. In FIG. 3D, the result set of query 334 is stored in cache 310. After cache node 112 receives an expected query from gateway 102, cache node 112 will update the next query pointer that references that expected query to reference the next element listed in the data chain. For example, after cache node 112 receives and processes the query identified by the hash "8", cache node 112 updates next query pointer 358' to reference the next subsequent element in data chain 254.

C. Gateway Receives a Query From a Client

Figure 3E:
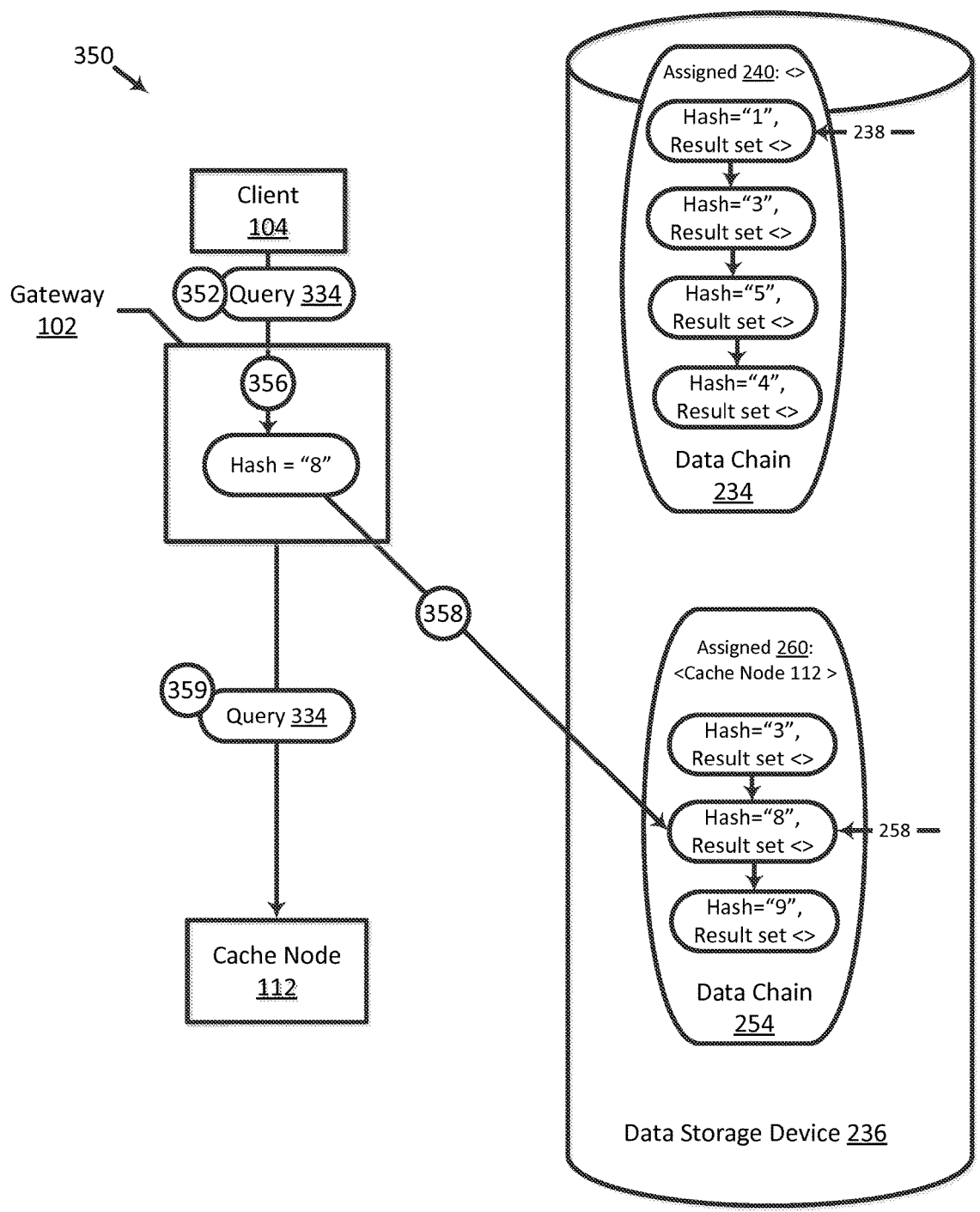

FIG. 3E illustrates example process flow 350 of gateway 102 receiving a query for processing from a client. In FIG. 3E, at an action 352, client 104 sends a current query 334 for execution at database 120, and gateway 102 receives the current query. At an action 356, gateway 102 hashes current query 334. The hash of current query 334 is "8." Query 334 may also be referred to as the "current query" because the query has been sent by a client but not yet processed.

At an action 358, gateway 102 determines whether the hash of query 334 ("8") matches a hash of any of the expected queries in data storage device 236, which stores data chain 234 or data chain 254. The hash of query 334 matches the hash of the second query listed in data chain 254 and referenced by next query pointer 258. Gateway 102 may determine whether the matching data chain 254 has been activated. In FIG. 3E, data chain 254 has been activated because the data chain has been assigned to a cache node.

At an action 359, if the matching data chain 254 has been activated, gateway 102 sends query 334 to the assigned cache node, which in this example is cache node 112. Gateway 102 may also send the hash of query 334, or leave it up to cache node 112 to hash query 334. After gateway 102 has received the expected query referenced by next query pointer 258, gateway 102 updates next query pointer 258 to reference the next element in the data chain. Accordingly, gateway 102 updates next query pointer 258 to reference the element including the hash "9".

Figure 3F:
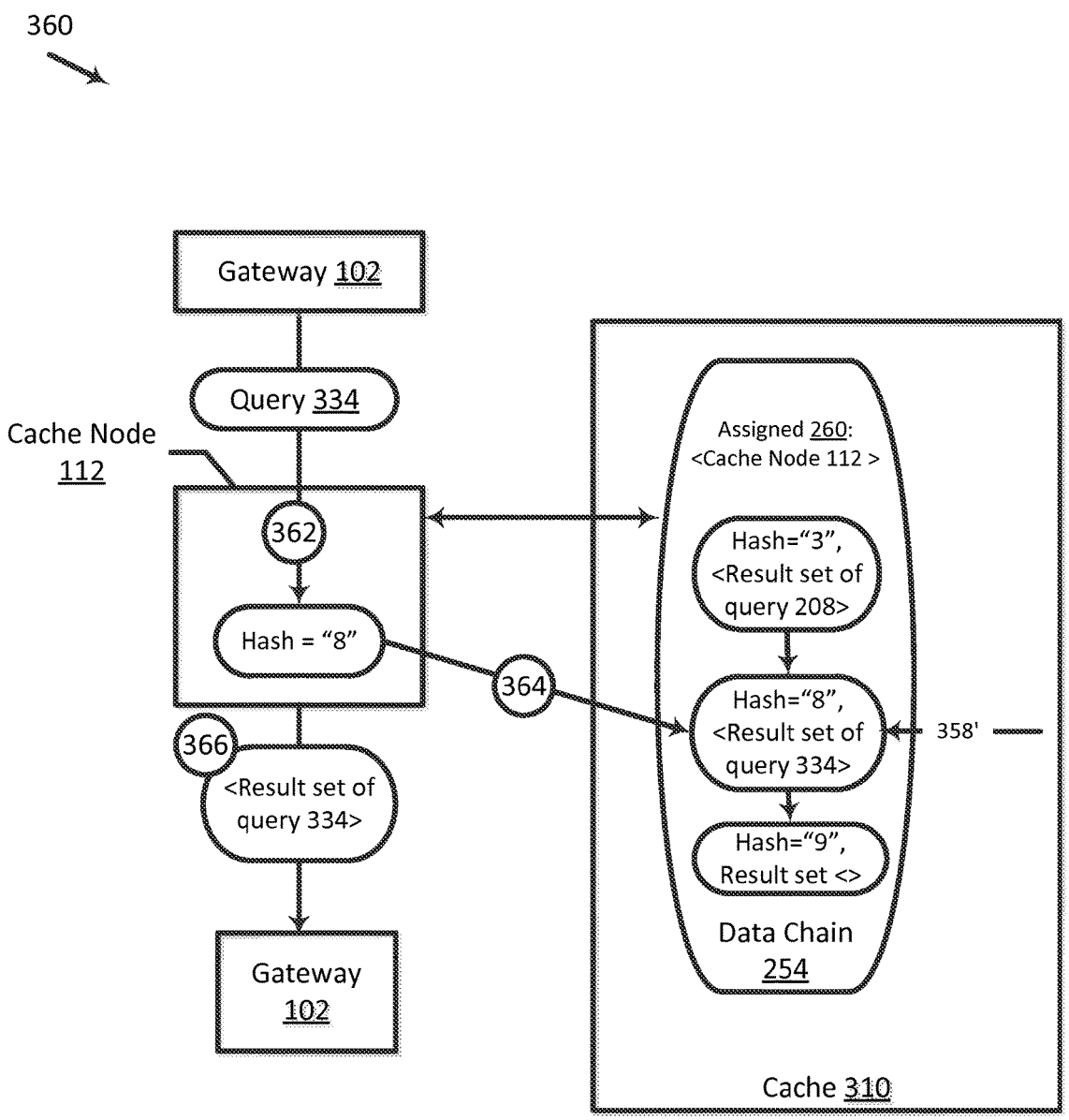

In FIG. 3F, cache node 112 may receive query 334 from gateway 102. At an action 362, cache node 112 hashes query 334. The hash of query 334 is "8". At an action 364, cache node 112 determines whether the hash of query 334 ("8") matches a hash of any of the expected queries in data chain 254. Reference 358' references an element including the hash "8", which matches the hash of current query 334. At an action 366, cache node 112 retrieves the result set of query 334 from cache 310 and sends this result set to gateway 102. In this example, it is unnecessary for cache node 112 to request the result set of query 334 from an external source (e.g., database 120 or another cache node). Cache node 112 may then update next query pointer 358' to reference the next element listed in data chain 254.

Figure 3G:
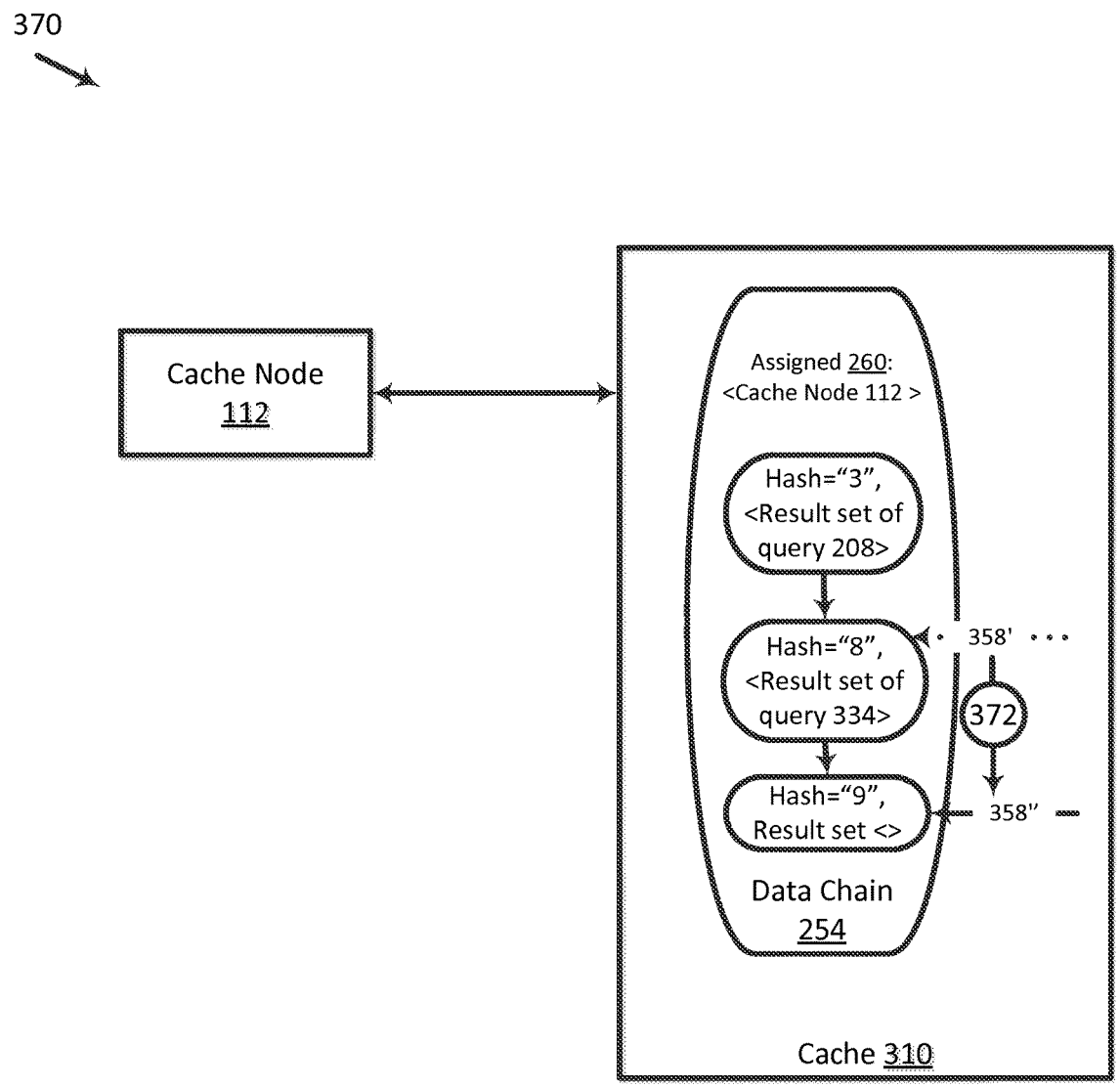

FIG. 3G illustrates an example of cache 310 after cache node 112 updates next query pointer 358' in accordance with some embodiments. In FIG. 3E, after cache node 112 receives the expected query identified by hash "8" from gateway 102, cache node 112 updates next query pointer 358' to reference the next element listed in the data chain. Next query pointer 358", which references the last element listed in data chain 254, represents the updated next query pointer 358'. Next query pointer 358" references a query in data chain 254 that cache node 112 expects to receive next; this query may be referred to as the expected query. Cache node 112 may preload a result set of the query identified by the hash "9" and store the result set in cache 310.

In FIG. 3G, updated next query pointer 358" references the last element in data chain 254. At a later point in time, if cache node 112 receives the query identified by the hash "9", cache node 112 may process the query by retrieving it from cache 310. Additionally, cache node 112 may send a message to gateway 102 that data chain 254 was predicted successfully and delete data chain 254 from cache 310. In some examples, if a time interval has elapsed and cache node 112 has still not received the last query in a data chain for processing for a client, cache node 112 may delete the data chain or set the result sets in the data chain to a blank state.

Gateway 102 may continually and simultaneously generate an ordered set of queries for each data chain interval to add to table 222, detect a popular sequence of queries in the ordered sets of queries, and send data chains, hashes, and/or queries to cache nodes for processing.

As discussed above and further emphasized here, FIGS. 1, 2A-2B, and 3A-3G are merely examples, which should not unduly limit the scope of the claims.

V. Example Methods

Figure 4:
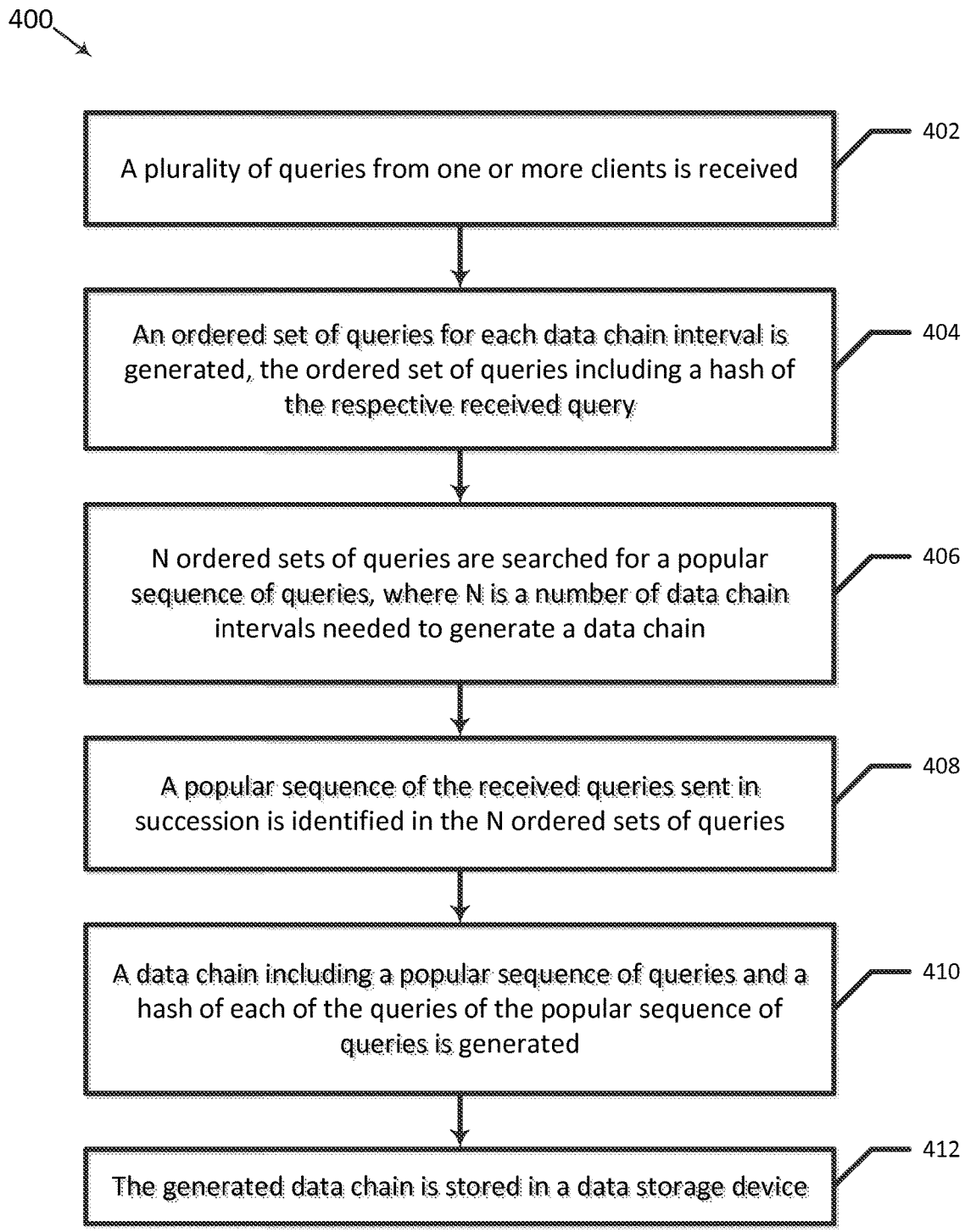
FIG. 4 is a flowchart illustrating a method of generating a data chain in accordance with some embodiments.

FIG. 4 is a flowchart illustrating a method 400 of generating a data chain in accordance with some embodiments. Method 400 is not meant to be limiting and may be used in other applications.

In FIG. 4, method 400 includes blocks 402-412. In a block 402, a plurality of queries from one or more clients is received. In an example, gateway 102 receives a plurality of queries from one or more clients 104 and 106. In a block 404, an ordered set of queries for each data chain interval is generated, the ordered set of queries including a hash of the respective received query. In an example, gateway 102 generates row 224-227, where each row includes an ordered set of queries and is generated for each data chain interval. The ordered set of queries includes a hash of the respective received query.

In a block 406, N ordered sets of queries are searched for a popular sequence of queries, where N is a number of data chain intervals needed to generate a data chain. In an example, gateway 102 searches N ordered sets of queries for a popular sequence of queries in table 222, where N is a number of data chain intervals needed to generate a data chain. In a block 408, a popular sequence of the received queries sent in succession is identified in the N ordered sets of queries. In an example, gateway 102 identifies a popular sequence of the received queries sent in succession in the N ordered sets of queries. In a block 410, a data chain including a popular sequence of queries and a hash of each of the queries of the popular sequence of queries is generated. In an example, gateway 102 generates a data chain including a popular sequence of queries and a hash of each of the queries of the popular sequence of queries. In a block 412, the generated data chain is stored in a data storage device. In an example, gateway 102 stores the generated data chain in data storage device 236.

It is understood that additional processes may be inserted before, during, or after blocks 402-412 discussed above. It is also understood that one or more of the blocks of method 400 described herein may be omitted, combined, or performed in a different sequence as desired.

Figure 5:
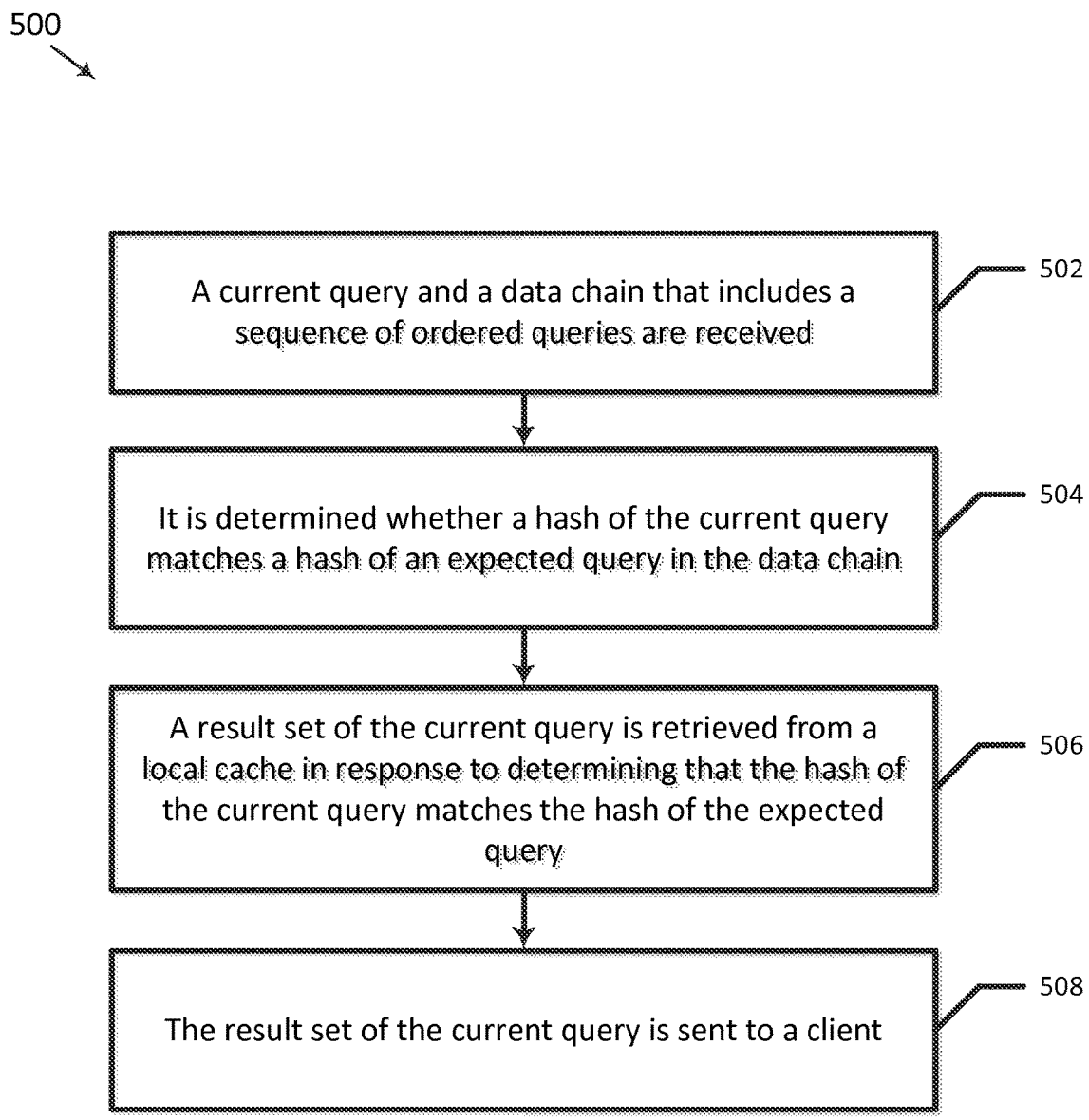
FIG. 5 is a flowchart illustrating a method of loading data from a database in accordance with some embodiments.

FIG. 5 is a flowchart illustrating a method 500 of loading data from a database in accordance with some embodiments. Method 500 is not meant to be limiting and may be used in other applications.

In FIG. 5, method 500 includes blocks 502-508. In a block 502, a current query and a data chain that includes a sequence of ordered queries are received. In an example, cache node 112 receives current query 334 (see FIG. 3F) and data chain 254 that includes a sequence of ordered queries identified by hashes "3", "8", and "9". In a block 504, it is determining whether a hash of the current query matches a hash of an expected query in the data chain. In an example, cache node 112 determines whether a hash of current query 334 matches a hash of an expected query in data chain 254. In a block 506, a result set of the current query is retrieved from a local cache in response to determining that the hash of the current query matches the hash of the expected query. In an example, cache node 112 retrieves a result set of current query 334 from cache 310 in response to determining that the hash of current query 334 matches the hash of the expected query. In an block 508, the result set of the current query is sent to a client. In an example, cache node 112 sends the result set of current query 334 to client 114.

In some embodiments, one or more actions illustrated in blocks 502-508 may be performed for any number of queries received by a cache node. Additionally, it is also understood that additional processes may be inserted before, during, or after blocks 502-508 discussed above. It is also understood that one or more of the blocks of method 500 described herein may be omitted, combined, or performed in a different sequence as desired.

VI. Example Computing System

Figure 6:
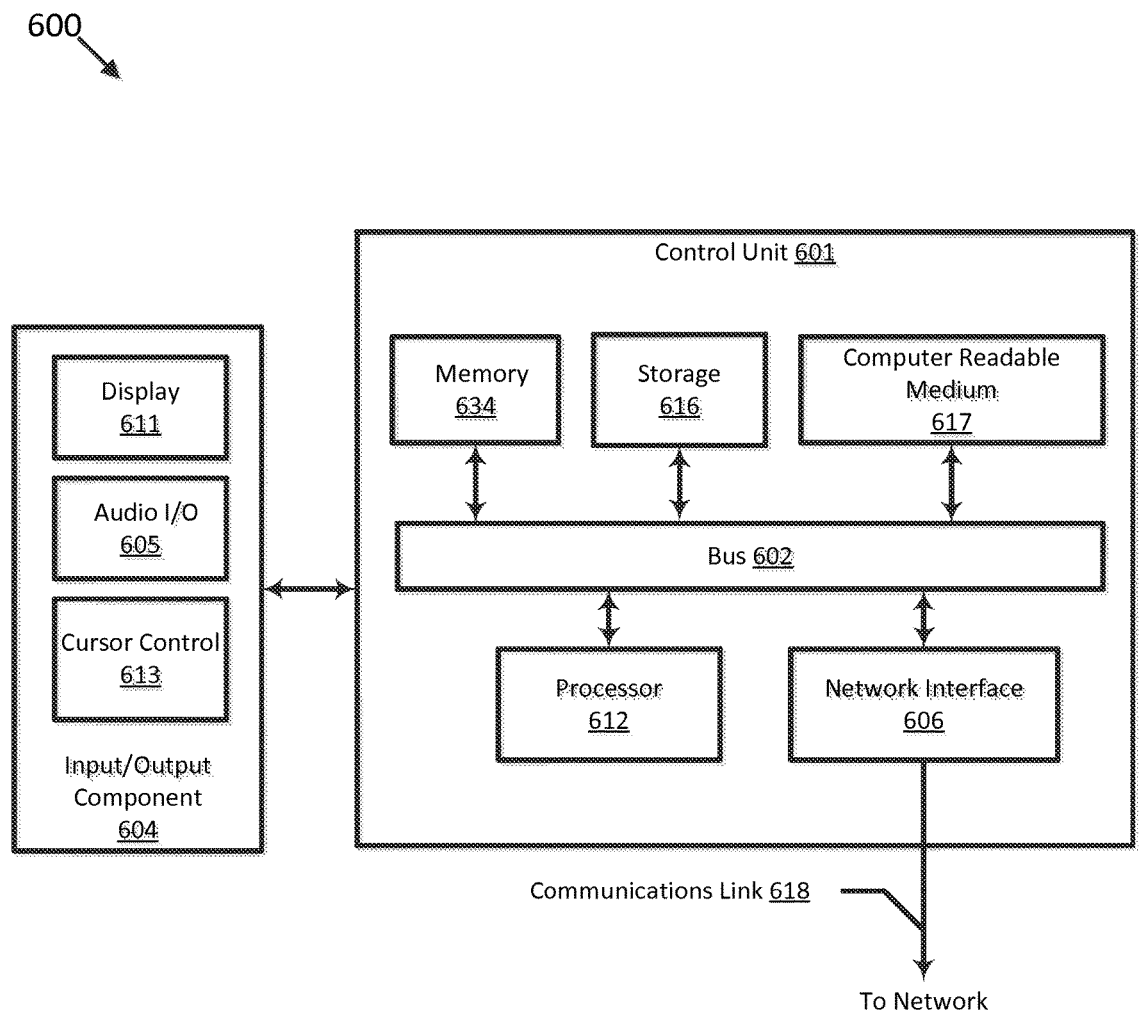
FIG. 6 is a block diagram of an electronic system suitable for implementing one or more embodiments of the present disclosure.

FIG. 6 is a block diagram of a computer system 600 suitable for implementing one or more embodiments of the present disclosure. Each of cache nodes 112, 114, and 116, clients 104 and 106, and gateway 102 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the application server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. A processor 612, which may be a micro-controller, digital signal processor (DSP), or other processing component, processes these various signals, such as for display on computer system 600 or transmission to other devices via communications link 608. Components of computer system 600 also include a system memory component 634 (e.g., RAM), a static storage component 616 (e.g., ROM), and/or a disk drive 617. Computer system 600 performs specific operations by processor 612 and other components by executing one or more sequences of instructions contained in system memory component 634.

Components include an input/output (I/O) component 604 that processes a user action, such as selecting keys from a keypad/keyboard, selecting one or more buttons or links, etc., and sends a corresponding signal to bus 602. I/O component 404 may include an output component such as a display 611, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 608 to a network. In an embodiment, the transmission is wireless, although other transmission mediums and methods may also be suitable.

Logic may be encoded in a computer readable medium 617, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 400 or method 500) to practice the present disclosure may be performed by computer system 600. In various other embodiments of the present disclosure, a plurality of computer systems 600 coupled by communications link 608 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of loading data from a database, comprising:
   receiving a plurality of queries from one or more clients in an order;
   generating an ordered set of queries for each data chain interval in accordance with the order, the ordered set of queries including a hash of the respective received query;
   searching the ordered sets of queries for a popular sequence of queries;
   updating the ordered sets of queries by removing each occurrence of the popular sequence of queries;
   generating one or more data chains, each data chain representing a popular sequence of queries and including a hash of each of the queries of the popular sequence of queries;
   receiving, at a first cache node, a current query and a data chain, the data chain including a sequence of ordered queries including the current query, a next query pointer referencing an expected query included in the data chain, and the current query originating from a client;
   storing, at the first cache node, the data chain into a local cache;
   determining whether a hash of the current query matches a hash of the expected query included in the data chain;
   receiving an indication that a second cache node has sent a first result set of the current query to the client;
   in response to determining that the hash of the current query matches the hash of the expected query and in response to receiving the indication, storing in a result set field for the current query a reference to the second cache node;
   updating the next query pointer to reference a next query after the current query in the data chain;
   receiving, at the first cache node, the next query, the next query originating from the client;
   retrieving a second result set of the next query from the local cache; and
   sending the second result set of the next query to the client.

2. The method of claim 1, wherein each query that precedes the expected query in the data chain has been processed.

3. The method of claim 1, wherein the current query is the expected query.

4. The method of claim 1, wherein the current query is different from the expected query.

5. The method of claim 1, further including:
   hashing each query of the plurality of queries; and
   storing the one or more generated data chains into a data storage device.

6. The method of claim 5, wherein a length of each popular sequence is greater than a length threshold.

7. The method of claim 5, wherein a frequency in which each popular sequence appears in the ordered sets of queries is greater than a frequency threshold.

8. The method of claim 1, further including:
   determining whether the next query is the last query in the data chain;
   deleting the data chain from the local cache in response to determining that the next query is the last query in the data chain; and
   updating the next query pointer to reference a second next query in the data chain in response to determining that the next query is not the last query in the data chain.

9. The method of claim 1, further including:
   searching the updated ordered sets of queries for a second popular sequence of queries; and
   after searching the updated ordered sets of queries, updating the ordered sets of queries by removing each occurrence of the second popular sequence of queries, wherein generating the one or more data chains includes generating a first data chain including the first popular sequence of queries represented by a first hash pattern and generating a second data chain including the second popular sequence of queries represented by a second hash pattern, the first hash pattern including a hash value of each of query included in the first popular sequence of queries, and the second hash pattern including a hash value of each query included in the second popular sequence of queries.

10. A system for loading data from a database, comprising:
    a non-transitory memory;
    one or more hardware processors coupled to the non-transitory memory and configured to read instructions from the non-transitory memory to cause the system to perform operations comprising:
      receiving a plurality of queries from one or more clients in an order;
      generating an ordered set of queries for each data chain interval in accordance with the order, the ordered set of queries including a hash of the respective received query;
      searching the ordered sets of queries for a popular sequence of queries;
      updating the ordered sets of queries by removing each occurrence of the popular sequence of queries;
      generating one or more data chains, each data chain representing a popular sequence of queries and including a hash of each of the queries of the popular sequence of queries;
      receiving, at a first cache node, a current query and a data chain, the data chain including a sequence of ordered queries including the current query, a next query pointer referencing an expected query included in the data chain, and the current query originating from a client;
      storing, at the first cache node, the data chain into a local cache;
      determining whether a hash of the current query matches a hash of the expected query included in the data chain;
      receiving an indication that a second cache node has sent a first result set of the current query to the client;

in response to determining that the hash of the current query matches the hash of the expected query and in response to receiving the indication, storing in a result set field for the current query a reference to the second cache node;

updating the next query pointer to reference a next query after the current query in the data chain;

receiving, at the first cache node, the next query, the next query originating from the client;

retrieving a second result set of the next query from the local cache; and sending the second result set of the next query to the client.

11. The system of claim 10, wherein each query that precedes the expected query in the data chain has been processed.

12. The system of claim 10, wherein the current query is the expected query.

13. The system of claim 10, wherein the current query is different from the expected query.

14. The system of claim 10, the operations further comprising:

hashing each query of the plurality of queries; and storing the one or more generated data chains into a data storage device.

15. The system of claim 14, wherein a length of each popular sequence is greater than a length threshold.

16. The system of claim 14, wherein a frequency in which each popular sequence appears in the ordered sets of queries is greater than a frequency threshold.

17. The system of claim 10, the operations further comprising:

determining whether the next query is the last query in the data chain; and deleting the data chain from the local cache in response to determining that the next query is the last query in the data chain.

18. The system of claim 17, the operations further comprising:

updating the next query pointer to reference a second next query in the data chain in response to determining that the next query is not the last query in the data chain.

19. A non-transitory machine-readable medium comprising a plurality of machine-readable instructions that when executed by one or more processors is adapted to cause the one or more processors to perform a method comprising:

receiving a plurality of queries from one or more clients in an order;

generating an ordered set of queries for each data chain interval in accordance with the order, the ordered set of queries including a hash of the respective received query;

searching the ordered sets of queries for a popular sequence of queries;

updating the ordered sets of queries by removing each occurrence of the popular sequence of queries;

generating one or more data chains, each data chain representing a popular sequence of queries and including a hash of each of the queries of the popular sequence of queries;

receiving, at a first cache node, a current query and a data chain, the data chain including a sequence of ordered queries including the current query, a next query pointer referencing an expected query included in the data chain, and the current query originating from a client;

storing, at the first cache node, the data chain into a local cache;

determining whether a hash of the current query matches a hash of the expected query included in the data chain;

receiving an indication that a second cache node has sent a first result set of the current query to the client;

in response to determining that the hash of the current query matches the hash of the expected query and in response to receiving the indication, storing in a result set field for the current query a reference to the second cache node;

updating the next query pointer to reference a next query after the current query in the data chain;

receiving, at the first cache node, the next query, the next query originating from the client;

retrieving a second result set of the next query from the local cache; and sending the second result set of the next query to the client.

20. The machine-readable medium of claim 19, the method further including:

searching the updated ordered sets of queries for a second popular sequence of queries; and after searching the updated ordered sets of queries, updating the ordered sets of queries by removing each occurrence of the second popular sequence of queries, wherein generating the one or more data chains includes generating a first data chain including the first popular sequence of queries represented by a first hash pattern and generating a second data chain including the second popular sequence of queries represented by a second hash pattern, the first hash pattern including a hash value of each of query included in the first popular sequence of queries, and the second hash pattern including a hash value of each query included in the second popular sequence of queries.

\* \* \* \* \*